US012750899B2

(12) United States Patent
Zhang et al.

(10) Patent No.: US 12,750,899 B2
(45) Date of Patent: Sep. 29, 2026

(54) SHARED TUNNEL MANAGEMENT METHOD AND APPARATUS, CORE NETWORK NODE AND ACCESS NETWORK NODE

(71) Applicant: VIVO MOBILE COMMUNICATION CO., LTD., Dongguan (CN)

(72) Inventors: Yanxia Zhang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 286 days.

(21) Appl. No.: 18/384,573

(22) Filed: Oct. 27, 2023

(65) Prior Publication Data

US 2024/0073975 A1 Feb. 29, 2024

Related U.S. Application Data

(63) Continuation of application No. PCT/CN2022/087869, filed on Apr. 20, 2022.

(30) Foreign Application Priority Data

Apr. 27, 2021 (CN) ......................... 202110460704.7
May 7, 2021 (CN) ......................... 202110497329.3

(51) Int. Cl.
*H04W 76/40* (2018.01)
*H04W 76/12* (2018.01)

(52) U.S. Cl.
CPC ........... *H04W 76/12* (2018.02); *H04W 76/40* (2018.02)

(58) Field of Classification Search
CPC ....... H04W 76/12; H04W 76/40; H04W 4/06; H04W 16/14; H04W 76/10; H04W 76/15; H04W 68/02
See application file for complete search history.

(56) References Cited

U.S. PATENT DOCUMENTS

| | | | | |
|---|---|---|---|---|
| 11,700,509 | B2 | 7/2023 | Yang et al. | |
| 2018/0049265 | A1* | 2/2018 | Liu | H04W 88/085 |
| 2020/0260233 | A1* | 8/2020 | Yang | H04W 76/11 |
| 2023/0025793 | A1 | 1/2023 | Xiong | |
| 2023/0050709 | A1* | 2/2023 | Lei | H04W 4/06 |
| 2023/0188949 | A1* | 6/2023 | Jia | H04W 76/12 455/458 |

(Continued)

FOREIGN PATENT DOCUMENTS

| | | | | |
|---|---|---|---|---|
| CN | 101778339 A | | 7/2010 | |
| CN | 109699013 A | * | 4/2019 | H04W 4/06 |

(Continued)

OTHER PUBLICATIONS

3rd Generation Partnership Project, “Technical Specification Group Services and System Aspects; Study on architectural enhancements for 5G multicast-broadcast services (Release 17)”, 3GPP TR 23.757, Mar. 2021.

(Continued)

*Primary Examiner* — Lakeram Jangbahadur
(74) *Attorney, Agent, or Firm* — The Webb Law Firm

(57) ABSTRACT

A shared tunnel management method includes obtaining, by a first core network node, MBS capability information of at least one access network node. The MBS capability information is used for management of shared tunnel establishment.

5 Claims, 4 Drawing Sheets

(56) References Cited

U.S. PATENT DOCUMENTS

| | | | | |
|---|---|---|---|---|
| 2024/0314523 | A1 * | 9/2024 | Gan | H04L 12/189 |

FOREIGN PATENT DOCUMENTS

| | | | | | |
|---|---|---|---|---|---|
| CN | 110098942 | A | * | 8/2019 | H04L 67/14 |
| CN | 111866757 | A | | 10/2020 | |
| CN | 111866758 | A | | 10/2020 | |
| CN | 112087722 | A | * | 12/2020 | H04W 72/30 |
| CN | 112243199 | A | * | 1/2021 | H04W 4/06 |

OTHER PUBLICATIONS

S2-2003966, KI#7, New Solution: Inter-RAN node MBS Session Handover, Jun. 1-12, 2020, 8 pages.

S2-2004223, Solution to KI#7: Mobility between 5G MBS supporting and 5G MBS non-supporting NG RAN nodes, Jun. 1-12, 2020, 3 pages.

NOKIA et al., "KI#1: Conclusion update for MBS Session activation/deactivation and UE join/leave", SA WG2 Meeting #143E, Electronic Meeting, Feb. 24-Mar. 9, 2020, S2-2101017.

* cited by examiner

SHARED TUNNEL MANAGEMENT METHOD AND APPARATUS, CORE NETWORK NODE AND ACCESS NETWORK NODE

CROSS-REFERENCE TO RELATED APPLICATIONS

This application is a Bypass Continuation Application of International Patent Application No. PCT/CN2022/087869 filed Apr. 20, 2022, and claims priority to Chinese Patent Application No. 202110460704.7 filed Apr. 27, 2021 and claims priority to Chinese Patent Application No. 202110497329.3 filed May 7, 2021, the disclosures of which are hereby incorporated by reference in their entireties.

BACKGROUND OF THE INVENTION

Field of the Invention

This application relates to the field of communication, and in particular, to a shared tunnel management method and apparatus, a core network node, and an access network node.

Description of Related Art

The New Radio (NR) R17 version can support providing a multicast broadcast service (MBS). Currently, to support the MBS, a shared tunnel (which can be understood as that the data tunnel is shared by multiple terminals) may be established between a base station and a core network device for transmitting service data of the MBS. While a radio access network (RAN) side can provide a multicast service through multicast bearer, and specifically, the MBS service can be provided in two manners: point to point (PTP) and point to multipoint (PTM). The PTM is a point to multipoint transmission mode, which can be understood as that in the RAN, a same wireless resource is used to transmit multicast service data to multiple terminals, and PTP is a point to point transmission mode, which can be understood as that in the RAN, a wireless resource dedicated to the terminal is used to transmit multicast service data to a specific terminal.

SUMMARY OF THE INVENTION

According to a first aspect, a shared tunnel management method is provided, including:

obtaining, by a first core network node, multicast broadcast service (MBS) capability information of at least one access network node, where the MBS capability information is used for management of shared tunnel establishment.

According to a second aspect, a shared tunnel management method is provided, including:

obtaining, by a second core network node, MBS capability information of an access network node, and initiating or rejecting initiating a shared tunnel establishment request based on the MBS capability information of the access network node; or sending, by the second core network node, a shared tunnel establishment request of the access network node to a first core network node, and receiving a shared tunnel establishment rejection message sent by the first core network node.

According to a third aspect, a shared tunnel management method is provided, including:

in a case that MBS capability acquisition request information sent by a first core network node is received, sending, by an access network node, multicast broadcast service (MBS) capability information to the first core network node; or sending, by the access network node, capability indication information to the first core network node, where the capability indication information is used to assist the first core network node in determining MBS capability information.

According to a fourth aspect, a multicast service tunnel management method is provided, including:

rejecting initiating, by a second core network node, a shared tunnel establishment request based on existence of a storage record for an information of an access network node; or initiating, by a second core network node, a shared tunnel establishment request based on non-existence of a storage record for an information of an access network node; or indicating or rejecting indicating, by a second core network node, establishment of a shared tunnel based on a state of a multicast session; or indicating, by a second core network node, establishment of a unicast tunnel based on existence of an access network node that does not support multicast in a multicast session; or rejecting indicating, by a second core network node, establishment of a unicast tunnel based on non-existence of an access network node that does not support multicast in a multicast session.

According to a fifth aspect, a shared tunnel management apparatus is provided, applied to a first core network node, and including:

an obtaining module, configured to obtain multicast broadcast service (MBS) capability information of at least one access network node, where the MBS capability information is used for management of shared tunnel establishment.

According to a sixth aspect, a core network node is provided, where the core network node is a first core network node and includes a processor, a memory, and a program or an instruction stored in the memory and executable on the processor, and when the program or the instruction is executed by the processor, steps of the shared tunnel management method according to the first aspect are implemented.

According to a seventh aspect, a core network node is provided, where the core network node is a first core network node and includes a processor and a communications interface. The processor is configured to obtain multicast broadcast service (MBS) capability information of at least one access network node, where the MBS capability information is used for management of shared tunnel establishment.

According to an eighth aspect, a shared tunnel management apparatus is provided, applied to a second core network node, and including:

a second execution module, configured to: obtain MBS capability information of an access network node, and initiate or reject initiating a shared tunnel establishment request based on the MBS capability information of the access network node; or send a shared tunnel establishment request of the access network node to a first core network node, and receive a shared tunnel establishment rejection message sent by the first core network node.

According to a ninth aspect, a core network node is provided, where the core network node is a second core network node and includes a processor, a memory, and a program or an instruction stored in the memory and executable on the processor, and when the program or the instruction is executed by the processor, steps of the shared tunnel management method according to the second aspect are implemented.

According to a tenth aspect, a core network node is provided, where the core network node is a second core network node and includes a processor and a communications interface, where the communications interface is configured to: obtain MBS capability information of an access network node, and initiate or reject initiating a shared tunnel establishment request based on the MBS capability information of the access network node; or send a shared tunnel establishment request of the access network node to a first core network node, and receive a shared tunnel establishment rejection message sent by the first core network node.

According to an eleventh aspect, a shared tunnel management apparatus is provided, applied to an access network node, and including:

a capability sending module, configured to: in a case that MBS capability acquisition request information sent by a first core network node is received, send multicast broadcast service (MBS) capability information to the first core network node; or send capability indication information to the first core network node, where the capability indication information is used to assist the first core network node in determining MBS capability information.

According to a twelfth aspect, an access network node is provided, including a processor, a memory, and a program or an instruction stored in the memory and executable on the processor, where when the program or the instruction is executed by the processor, steps of the shared tunnel management method according to the third aspect are implemented.

According to a thirteenth aspect, an access network node is provided, including a processor and a communications interface, where the communications interface is configured to: in a case that MBS capability acquisition request information sent by a first core network node is received, send multicast broadcast service (MBS) capability information to the first core network node; or send capability indication information to the first core network node, where the capability indication information is used to assist the first core network node in determining MBS capability information.

According to a fourteenth aspect, a multicast service tunnel management apparatus is provided, applied to a second core network node, and including:

a third execution module, configured to: reject initiating a shared tunnel establishment request based on existence of a storage record for an information of an access network node; or initiate a shared tunnel establishment request based on non-existence of a storage record for an information of an access network node; or indicate or reject indicating establishment of a shared tunnel based on a state of a multicast session; or indicate establishment of a unicast tunnel based on existence of an access network node that does not support multicast in a multicast session; or reject indicating establishment of a unicast tunnel based on non-existence of an access network node that does not support multicast in a multicast session.

According to a fifteenth aspect, a core network node is provided, where the core network node is a second core network node and includes a processor, a memory, and a program or an instruction stored in the memory and executable on the processor, and when the program or the instruction is executed by the processor, steps of the multicast service tunnel management method according to the fourth aspect are implemented.

According to a sixteenth aspect, a core network node is provided, where the core network node is a second core network node and includes a processor and a communications interface. The processor is configured to:

reject initiating a shared tunnel establishment request based on existence of a storage record for an information of an access network node; or initiate a shared tunnel establishment request based on non-existence of a storage record for an information of an access network node; or indicate or reject indicating establishment of a shared tunnel based on a state of a multicast session; or indicate establishment of a unicast tunnel based on existence of an access network node that does not support multicast in a multicast session; or reject indicating establishment of a unicast tunnel based on non-existence of an access network node that does not support multicast in a multicast session.

According to a seventeenth aspect, a non-transitory computer-readable storage medium is provided. The non-transitory computer-readable storage medium stores a program or an instruction, and when the program or the instruction is executed by a processor, steps of the method according to the first aspect, the second aspect, the third aspect, or the fourth aspect are implemented.

According to an eighteenth aspect, a chip is provided. The chip includes a processor and a communications interface, the communications interface is coupled to the processor, and the processor is configured to execute a program or an instruction to implement steps of the method according to the first aspect, the second aspect, the third aspect, or the fourth aspect.

According to a nineteenth aspect, a computer program/program product is provided. The computer program/program product is stored in a non-volatile storage medium, and the program/program product is executed by at least one processor to implement steps of the method according to the first aspect, the second aspect, the third aspect, or the fourth aspect.

According to a twentieth aspect, an embodiment of this application provides a communications device, configured to perform steps of the method according to the first aspect, configured to perform steps of the method according to the second aspect, configured to perform steps of the method according to the third aspect, or configured to perform steps of the method according to the fourth aspect.

DESCRIPTION OF THE INVENTION

Figure 1:
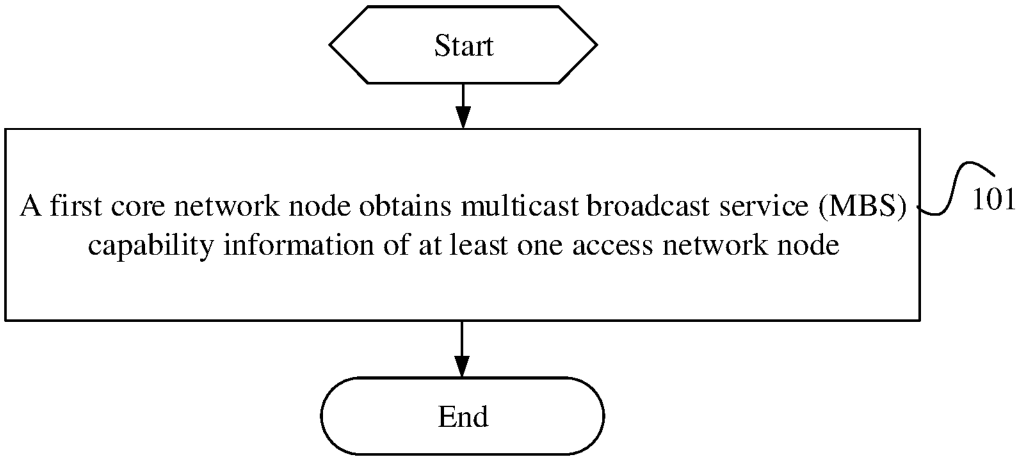
FIG. 1 is a first schematic flowchart of a shared tunnel management method according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms “first”, “second”, and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by “first” and “second” are usually of a same type, and the number of objects is not limited. For example, there may be one or more first objects. In addition, in the description and the claims, “and/or” represents at least one of connected objects, and a character “I” generally represents an “or” relationship between associated objects.

It should be noted that, the technologies described in the embodiments of this application are not limited to a Long Term Evolution (LTE)/LTE-Advanced (LTE-A) system, and can also be used in other wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms “system” and “network” in the embodiments of this application may be used interchangeably. The described technologies can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6th generation (6G) communications system.

The following describes a shared tunnel management method and apparatus, a core network node, and an access network node provided in the embodiments of this application through some embodiments and application scenarios thereof with reference to the accompanying drawings.

At present, the core network can actively trigger establishment of a shared tunnel with the base station (such as establishment of a shared data tunnel for a broadcast service). Because the core network cannot acquire whether the base station supports the establishment of the shared tunnel, sometimes initiated shared tunnel establishment may fail. It can also be understood that the core network may initiate an unnecessary shared tunnel establishment process.

In an ideal backhaul, scheduling information and feedback information of user equipment (UE) can be exchanged between multiple transmission reception points (TRP) in real time, and in addition to scheduling multiple physical downlink shared channel (PDSCH) by using multiple downlink control information (DCI), the PDSCH can also be scheduled with single DCI, which includes the following transmission schemes.

(1) Space division multiplexing (SDM): different data layers of a same transport block (TB) come from non-coherent joint transmission (NCJT) of different TRPs.

(2) Frequency division multiplexing (FDM): different frequency domain resources mapped by a same redundancy version (RV) of a same TB originate from different TRPs, or different RVs of a same TB are mapped to different frequency domain resources and originate from different TRPs.

(3) Time division multiplexing (TDM): multiple repetitions of different RVs of a same TB come from different TRPs, such as repetitions in one time slot or repetitions in multiple time slots.

In this case, acknowledgement/negative acknowledge (ACK/NACK) feedback and a channel state information (CSI) report can be fed back to any TRP.

However, existing mapping of the CSI report is mainly designed for one measurement hypothesis, and cannot support multiple measurement hypotheses well.

As shown in FIG. 1, an embodiment of this application provides a shared tunnel management method, including the following steps.

Step 101. A first core network node obtains multicast broadcast service (MBS) capability information of at least one access network node.

It should be noted that by increasing the MBS capability information of the access network node, the MBS capability information is used for management of the shared tunnel establishment, to ensure that the shared tunnel is associated with the MBS capability information of the access network node and avoid the core network node from initiating an invalid shared tunnel establishment process as much as possible.

It should be noted that, optionally, after step 101, the shared tunnel management method may further include:

performing a first operation based on the MBS capability information of the access network node.

It should be noted that in this embodiment of this application, the first core network node can obtain the MBS capability information of at least one access network node, the MBS capability information is used to indicate whether the access network node supports the MBS or not, that is, the first core network node can acquire whether each access network node in all access network nodes supports the MBS, and then performs the first operation based on this.

Optionally, the first operation may include at least one of A11 or A12.

A11. Indicate the MBS capability information of the access network node to a second core network node.

It should be noted that because the first core network node can obtain MBS capability information of all access network nodes, while the shared tunnel establishment request sent by the second core network node is aimed at one or more access network nodes, the first core network node can send, when sending the MBS capability information of the access network node, only MBS capability information of an access network node that needs to establish a shared tunnel. For example, when the second core network node needs to create a shared tunnel with an access network node 1 and an access network node 2, the second core network node may send an MBS capability information acquisition request to the first core network node to obtain MBS capability information of the access network node 1 and the access network node 2. Certainly, the first core network node can also actively send the MBS capability information of the access network node to the second core network node. For example, the first core network node can send MBS capability information of each access network node to the second core network node in turn.

A12. Respond to a shared tunnel establishment request sent by the second core network node.

Behaviors in each operation are described as follows.

As for A11, optionally, A11 can be implemented in at least one of A111 or A112.

A111. The first core network node sends the MBS capability information of the access network node to the second core network node.

That is, in this manner, the first core network node directly sends the MBS capability information of the access network node to the second core network node.

A112. The first core network node sends the MBS capability information of the access network node to the second core network node through a third core network node.

That is, in this manner, the first core network node does not directly send the MBS capability information of the access network node to the second core network node, but sends the MBS capability information through the third core network node (that is, another core network nodes other than the first core network node and the second core network node). For example, as an example, when the first core network node receives a message with a message destination of the second core network node, the MBS capability information of the access network node is additionally carried in the message. For example, the terminal initiates, through the access network node, a request message received by joining an MBS service, and the first core network node (such as an access and mobility management function (AMF)) additionally carries the MBS capability information of the access network node in the request message after receiving the request message. After the second core network node (such as a multicast broadcast session management function (MB-SMF)) receives the request message that carries the MBS capability information of the access network node and that is received by joining the MBS service, the second core network node determines whether to initiate the shared tunnel establishment request based on the MBS capability information of the access network node. As an implementation, after the first core network node (such as the AMF) obtains the MBS capability information of the access network node, the first core network node indicates the MBS capability information of the access network node to the third core network node (such as the SMF), and the third core network node indicates the MBS capability information of the access network node to the second core network node (such as the MB-SFM).

Optionally, in this operation manner, optionally, after receiving the MBS capability information that is of the access network node and is indicated by the first core network node, the second core network node initiates or rejects initiating a shared tunnel establishment request based on the MBS capability information of the access network node. That is, in a case that the access network node does not support the MBS, the second core network node rejects initiating the shared tunnel establishment request to the access network node; or in a case that the access network node supports the MBS, the second core network node initiates the shared tunnel establishment request to the access network node.

It should also be noted that in one case, the second core network node can receive the MBS capability information that is of the access network node and is indicated by the first core network node, and in this case, it is not necessary for the second core network node to obtain the MBS capability information of the access network node by itself. In another case, the second core network node can also determine the MBS capability information of the access network node based on established service information between the second core network node and the access network node. In this case, the second core network node needs to obtain the MBS capability information of the access network node by itself.

As for A12, optionally, A12 can be implemented in at least one of A121 or 122.

A121. Receive the shared tunnel establishment request sent by the second core network node, and accept or reject the shared tunnel establishment request based on the MBS capability information of the access network node.

It should be noted that an optional implementation process in this manner is as follows.

A1211. Reject the shared tunnel establishment request in a case that the MBS capability information indicates that the access network node does not support an MBS.

In a case that the first core network node rejects the shared tunnel establishment request, the first core network node needs to send a shared tunnel establishment rejection message to the second core network node. That is, the shared tunnel establishment rejection message is sent, based on the MBS capability information of the access network node, by the first core network node in a case that it is determined that the access network node does not support the MBS. After receiving the shared tunnel establishment rejection message, the second core network node determines that the access network node does not support the MBS, and rejects initiating the shared tunnel establishment request to the access network node.

For example, the second core network node sends a shared tunnel establishment request message to the first core network node to request establishment of a shared tunnel with the access network node 1, and the first core network node rejects establishing the shared tunnel when determining that the access network node 1 does not support the MBS; and after receiving the shared tunnel establishment rejection message, the second core network node determines that the access network node 1 does not support the capability of the MBS, and therefore, the second core network node does not request to establish a data sharing tunnel with the access network node 1 subsequently.

A1212. Accept the shared tunnel establishment request in a case that the MBS capability information indicates that the access network node supports the MBS.

In a case that the first core network node accepts the shared tunnel establishment request, the first core network node directly sends the shared tunnel establishment request message to the access network node to establish the shared tunnel.

A122. Receive the shared tunnel establishment request sent by the second core network node, and send a group notification message or single terminal paging to the access network node based on the MBS capability information of the access network node and a state of a terminal.

The terminal is determined based on the shared tunnel establishment request.

It should be noted herein that the group notification message is used to notify the terminal of accessing the network, and the single terminal paging is also used to notify the terminal of accessing the network.

It should be noted that an optional implementation process in this manner is as follows.

A1221. In a case that the MBS capability information indicates that the access network node does not support the MBS, and the terminal is in an idle state, send the single terminal paging to the access network node.

A1222. In a case that the MBS capability information indicates that the access network node supports the MBS, and the terminal is in an idle state, send the group notification message to the access network node.

It should also be noted that step 101 in this embodiment of this application can be one of the following implementations.

B11. Send MBS capability acquisition request information to the at least one access network node, and receive MBS capability information fed back by the at least one access network node based on the MBS capability acquisition request information.

That is, the MBS capability information in this manner is sent based on a request of the first core network node. The first core network node needs to obtain MBS capability information of one or more access network nodes, and then the first core network node can send the MBS capability acquisition request information to these access network nodes. After receiving the MBS capability acquisition request information sent by the first core network node, the access network node feeds back the MBS capability information to the first core network node.

For example, the first core network node sends the MBS capability acquisition request information to an access network node A, and the access network node A feeds back capability acquisition response information to the first core network node, where the capability acquisition response information carries the MBS capability information.

B12. Receive capability indication information sent by the at least one access network node, and determine MBS capability information of the at least one access network node based on the capability indication information.

For example, as an implementation, the access network node may carry the capability indication information of the access network node in a process of initiating establishment of an NG interface between the access network node and the first core network node.

It should also be noted that the MBS capability information in this manner is actively, indirectly or directly sent by the access network node to the first core network node. Direct sending means that capability indication is MBS capability information, while indirect sending means that the capability indication carries a variety of information, one of which is the MBS capability information, or the capability indication can indirectly reflect the MBS capability information, for example, the access network node sends capability indication information, and the first core network node can infer the MBS capability information based on the capability indication information.

For example, when the capability indication information is the MBS capability information, an NG setup request message carries MBS capability information that the access network node supports the MBS, or carries MBS capability information that the access network node does not support the MBS capability, or the access network node does not carry the MBS capability information. It can be understood that, when the access network node does not carry the MBS capability information, the first core network node may default that the access network node does not support the MBS.

It should also be noted that, optionally, the first core network node mentioned in this embodiment of this application may be an access and mobility management function (AMF) entity; and the second core network node is a management node of a shared tunnel, for example, the second core network node may be a multicast broadcast session management function (MB-SMF) entity.

The following uses the AMF entity and the MB-SMF entity as examples to describe the implementation of this application, which is as follows.

Implementation 1: The AMF entity obtains the MBS capability information of at least one access network node, and the AMF entity sends MBS capability information of an access network node A to the MB-SMF entity. When the MB-SMF entity needs to establish a shared tunnel with the access network node A, the MB-SMF entity first determines, based on the MBS capability information of the access network node A, whether the access network node A supports the MBS, initiates a shared tunnel establishment request if the access network node A supports the MBS, and rejects initiating the shared tunnel establishment request if the access network node A does not support the MBS.

It should be noted that in the implementation 1, shared tunnel establishment is managed from the perspective of the MB-SMF entity, that is, the MB-SMF entity only establishes a shared tunnel with an access network node supporting the MBS, so as to avoid an unnecessary shared tunnel establishment process and reduce signaling overhead.

Implementation 2: The AMF entity obtains the MBS capability information of at least one access network node, and in a case of receiving a shared tunnel establishment request with an access network node B sent by the MB-SMF entity, the AMF entity determines, based on MBS capability information of the access network node B, whether to accept or reject the shared tunnel establishment request. The AMF entity accepts the shared tunnel establishment request in a case that the access network node B supports the MBS, and sends a shared tunnel establishment request message to the access network node B, and if the access network node B does not support the MBS, the AMF entity rejects the shared tunnel establishment request, and sends a shared tunnel establishment rejection message to the MB-SMF entity.

It should be noted that this implementation is different from the implementation 1 in that the AMF entity does not send the MBS capability information to the MB-SMF entity, that is, the MB-SMF entity directly sends the shared tunnel establishment request, and the AMF entity determines whether to allow the shared tunnel establishment request. This implementation can also avoid an unnecessary shared tunnel establishment process and reduce signaling overhead.

It should be noted that in this embodiment of this application, the core network node can obtain the MBS capability of the access network node, so as to avoid initiating an unnecessary shared tunnel establishment process subsequently, and avoid the waste of communications resources.

It should be noted that, the shared tunnel management method provided in the embodiments of this application may be performed by a shared tunnel management apparatus, or a control module, in the shared tunnel management apparatus, configured to perform the shared tunnel management method. In the embodiments of this application, an example in which the shared tunnel management apparatus performs the shared tunnel management method is used to describe the shared tunnel management apparatus provided in the embodiments of this application.

Figure 2:
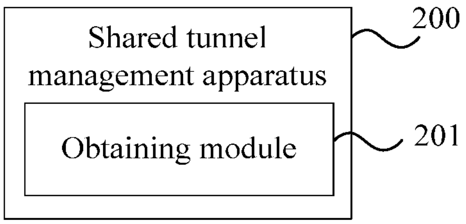
FIG. 2 is a first structural block diagram of a shared tunnel management apparatus according to an embodiment of this application.

As shown in FIG. 2, an embodiment of this application provides a shared tunnel management apparatus 200, including:

an obtaining module 201, configured to obtain multicast broadcast service (MBS) capability information of at least one access network node, where the MBS capability information is used for management of shared tunnel establishment.

Optionally, after the obtaining module 201 obtains the multicast broadcast service (MBS) capability information of the at least one access network node, the apparatus further includes:

a first execution module, configured to perform a first operation based on the MBS capability information of the access network node, where the first operation includes at least one of:

indicating the MBS capability information of the access network node to a second core network node; or responding to a shared tunnel establishment request sent by the second core network node.

Optionally, the MBS capability information indicates that the access network node supports or does not support an MBS.

Optionally, an implementation of responding to a shared tunnel establishment request sent by the second core network node includes at least one of:

receiving the shared tunnel establishment request sent by the second core network node, and accepting or rejecting the shared tunnel establishment request based on the MBS capability information of the access network node; or receiving the shared tunnel establishment request sent by the second core network node, and sending a group notification message or single terminal paging to the access network node based on the MBS capability information of the access network node and a state of a terminal, where the terminal is determined based on the shared tunnel establishment request.

Optionally, an implementation of accepting or rejecting the shared tunnel establishment request based on the MBS capability information of the access network node includes:

rejecting the shared tunnel establishment request in a case that the MBS capability information indicates that the access network node does not support an MBS; and accepting the shared tunnel establishment request in a case that the MBS capability information indicates that the access network node supports the MBS.

Optionally, in a case of accepting the shared tunnel establishment request, the shared tunnel management apparatus further includes:

a first sending module, configured to send a shared tunnel establishment request message to the access network node.

Optionally, in a case of rejecting the shared tunnel establishment request, the shared tunnel management apparatus further includes:

a second sending module, configured to send a shared tunnel establishment rejection message to the second core network node.

Optionally, an implementation of sending a group notification message or single terminal paging to the access network node based on the MBS capability information of the access network node and a state of a terminal includes:

in a case that the MBS capability information indicates that the access network node does not support the MBS, and the terminal is in an idle state, sending the single terminal paging to the access network node; and in a case that the MBS capability information indicates that the access network node supports the MBS, and the terminal is in an idle state, sending the group notification message to the access network node.

Optionally, the group notification message is used to notify the terminal of accessing a network.

Optionally, the single terminal paging is used to notify the terminal of accessing a network.

Optionally, the obtaining module 201 is configured to:

send MBS capability acquisition request information to the at least one access network node, and receive MBS capability information fed back by the at least one access network node based on the MBS capability acquisition request information; or receive capability indication information sent by the at least one access network node, and determine MBS capability information of the at least one access network node based on the capability indication information.

Optionally, an implementation of indicating the MBS capability information of the access network node to a second core network node includes:

sending, by the first core network node, the MBS capability information of the access network node to the second core network node; or sending, by the first core network node, the MBS capability information of the access network node to the second core network node through a third core network node.

It should be noted that by indicating the MBS capability information of the access network node to the second core network node based on the MBS capability information of at least one access network node, or responding to the shared tunnel establishment request sent by the second core network node, it can be ensured that an effective shared tunnel can be established in the core network, and the waste of communications resources can be avoided.

The shared tunnel management apparatus in this embodiment of this application may be an apparatus or electronic device with an operating system, or may be a component, an integrated circuit, or a chip in an electronic device. The apparatus or electronic device is mainly a non-mobile terminal. For example, the non-mobile terminal may be a server, a network attached storage (NAS), a personal computer (PC), a television (TV), a teller machine, a self-service machine, or the like. This is not limited in the embodiments of this application.

The shared tunnel management apparatus provided in this embodiment of this application can implement the processes implemented in the method embodiment in FIG. 1, and achieve a same technical effect. To avoid repetition, details are not provided herein again.

An embodiment of this application further provides a core network node, the core network node is a first core network node and includes a processor and a communications interface, and the processor is configured to:

obtain multicast broadcast service (MBS) capability information of at least one access network node, where the MBS capability information is used for management of shared tunnel establishment.

Figure 3:
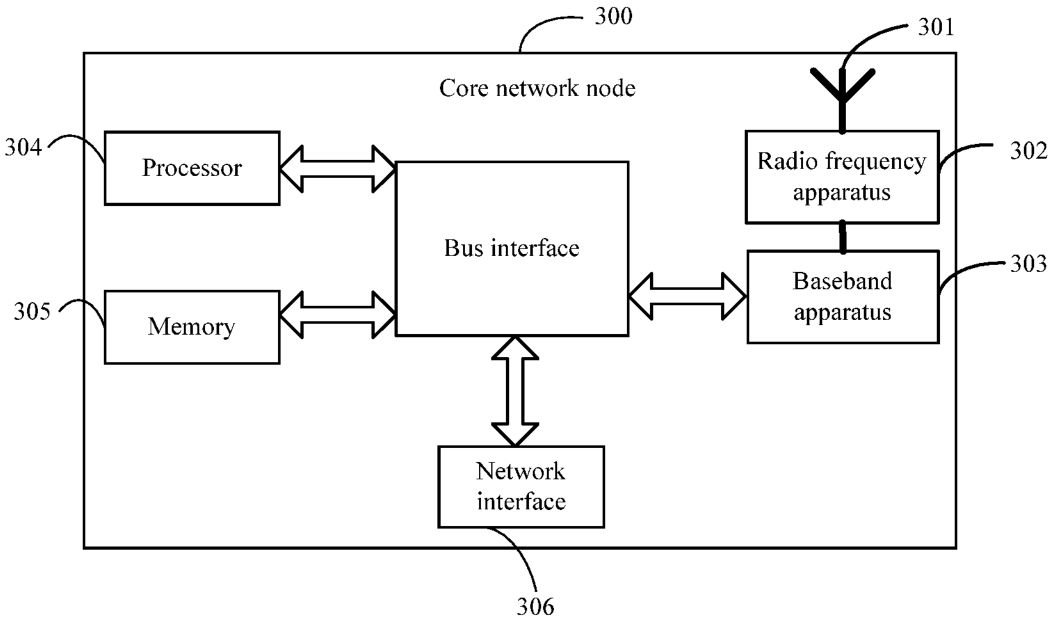
FIG. 3 is a structural block diagram of a core network node according to an embodiment of this application.

The core network node embodiment is corresponding to the first core network node side method embodiment, each implementation process and implementation of the method embodiment can be applied to the core network node embodiment, and a same technical effect can be achieved. For example, FIG. 3 is a schematic diagram of a hardware structure of a core network node according to an embodiment of this application.

The core network node 300 includes an antenna 301, a radio frequency apparatus 302, and a baseband apparatus 303. The antenna 301 is connected to the radio frequency apparatus 302. In an uplink direction, the radio frequency apparatus 302 receives information by using the antenna 301, and sends the received information to the baseband apparatus 303 for processing. In a downlink direction, the baseband apparatus 303 processes information to be sent and sends processed information to the radio frequency apparatus 302, and the radio frequency apparatus 302 processes the received information and sends processed information through the antenna 301.

The foregoing band processing apparatus may be located in the baseband apparatus 303, and the method performed by the core network node in the foregoing embodiment may be implemented in the baseband apparatus 303. The baseband apparatus 303 includes a processor 304 and a memory 305.

The baseband apparatus 303 may include, for example, at least one baseband board, where multiple chips are disposed on the baseband board. As shown in FIG. 3, one chip is, for example, the processor 304, which is connected to the memory 305, to invoke a program in the memory 305, and perform core network node operations shown in the foregoing method embodiment.

The baseband apparatus 303 may further include a network interface 306, configured to exchange information with the radio frequency apparatus 302. For example, the interface is a common public radio interface (CPRI).

For example, the core network node in this embodiment of this application further includes programs or instructions stored in the memory 305 and executable on the processor 304, and the processor 304 invokes the programs or instructions in the memory 305 to perform the method performed by the modules show in FIG. 2, and a same technical effect is achieved. To avoid repetition, details are not provided herein again.

For example, an embodiment of this application further provides a core network node, where the core network node is a first core network node, and includes a processor, a memory, and a program or an instruction stored in the memory and executable on the processor. When the program or the instruction is executed by the processor, the processes of the embodiment of the shared tunnel management method applied to a first core network node side are implemented, and a same technical effect can be achieved. To avoid repetition, details are not described herein again.

An embodiment of this application further provides a non-transitory computer-readable storage medium. The non-transitory computer-readable storage medium stores a program or an instruction. When the program or the instruction is executed by a processor, the processes of the embodiment of the shared tunnel management method applied to a first core network node side are implemented, and a same technical effect can be achieved. To avoid repetition, details are not described herein again. The non-transitory computer-readable storage medium includes a read-only memory (ROM), a random access memory (RAM), a magnetic disk, an optical disc, or the like.

Figure 4:
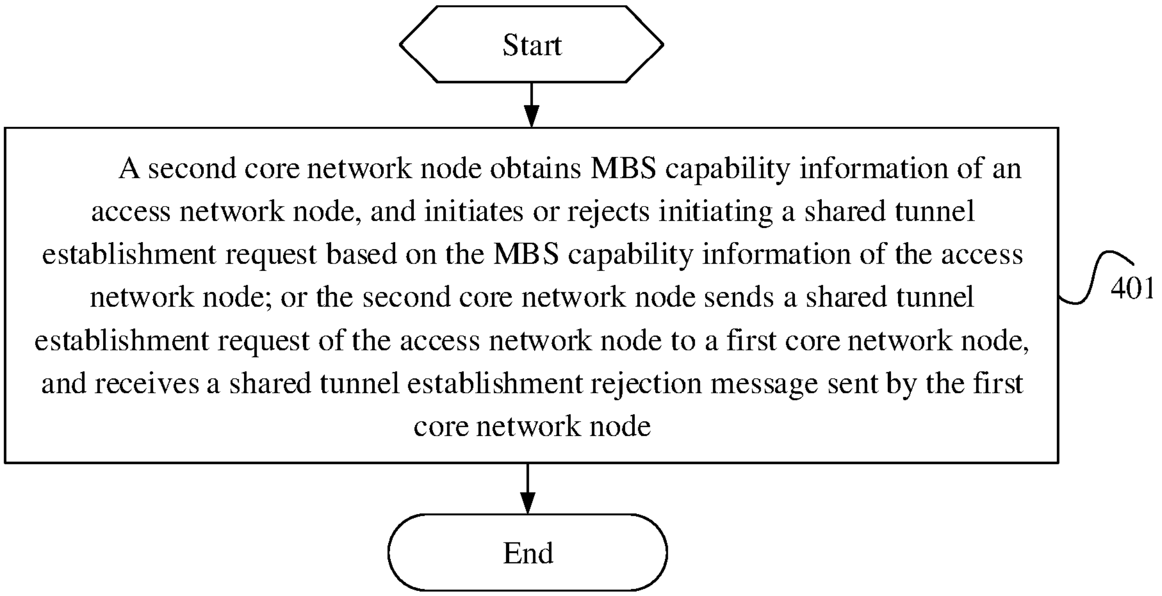
FIG. 4 is a second schematic flowchart of a shared tunnel management method according to an embodiment of this application.

As shown in FIG. 4, an embodiment of this application further provides a shared tunnel management method, including the following steps.

Step 401. A second core network node obtains MBS capability information of an access network node, and initiates or rejects initiating a shared tunnel establishment request based on the MBS capability information of the access network node; or the second core network node sends a shared tunnel establishment request of the access network node to a first core network node, and receives a shared tunnel establishment rejection message sent by the first core network node.

Optionally, the MBS capability information indicates that the access network node supports or does not support an MBS.

Optionally, the shared tunnel establishment rejection message is sent, based on the MBS capability information of the access network node, by the first core network node in a case that it is determined that the access network node does not support an MBS.

Optionally, the initiating or rejecting initiating a shared tunnel establishment request based on the MBS capability information of the access network node includes:

in a case that the access network node does not support an MBS, rejecting initiating, by the second core network node, the shared tunnel establishment request to the access network node; or in a case that the access network node supports an MBS, initiating, by the second core network node, the shared tunnel establishment request to the access network node.

Optionally, after the receiving a shared tunnel establishment rejection message sent by the first core network node, the method further includes:

in a case that it is determined that the access network node does not support an MBS, rejecting initiating the shared tunnel establishment request to the access network node.

Optionally, the obtaining, by a second core network node, MBS capability information of an access network node includes at least one of:

receiving the MBS capability information that is of the access network node and is indicated by the first core network node; or determining the MBS capability information of the access network node based on established service information between the second core network node and the access network node.

It should be noted that all descriptions of the second core network node in the foregoing embodiments are applicable to the embodiment, and a technical effect same as the foregoing embodiment can also be achieved. Details are not described herein again.

Figure 5:
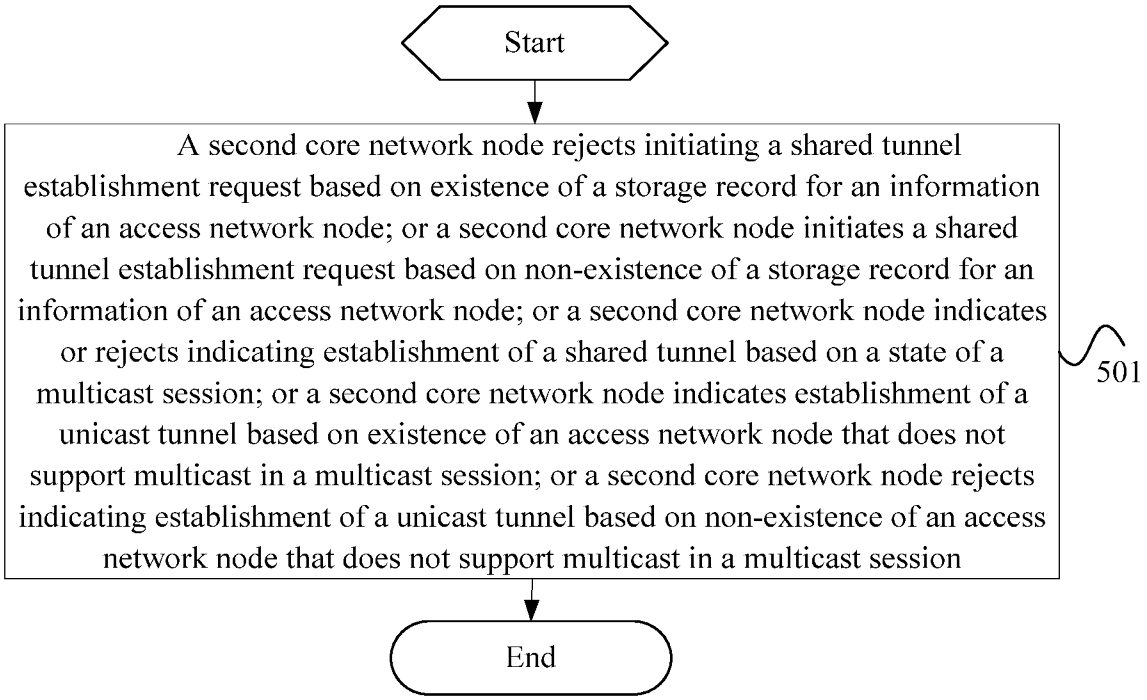
FIG. 5 is a schematic flowchart of a multicast service tunnel management method according to an embodiment of this application.

As shown in FIG. 5, an embodiment of this application further provides a multicast service tunnel management method, including the following steps.

Step 501. A second core network node rejects initiating a shared tunnel establishment request based on existence of a storage record for an information of an access network node;

or a second core network node initiates a shared tunnel establishment request based on non-existence of a storage record for an information of an access network node; or a second core network node indicates or rejects indicating establishment of a shared tunnel based on a state of a multicast session; or a second core network node indicates establishment of a unicast tunnel based on existence of an access network node that does not support multicast in a multicast session; or a second core network node rejects indicating establishment of a unicast tunnel based on non-existence of an access network node that does not support multicast in a multicast session.

Optionally, the storage record is used to indicate that the access network node has joined the multicast session.

Optionally, in a case that the multicast session is in an active state, it indicates establishment of the shared tunnel.

Optionally, in a case that the multicast session is in an inactive state, it rejects indicating establishment of the shared tunnel.

Optionally, the indicating establishment of the shared tunnel includes:

sending an instruction for establishing the shared tunnel to the access network node through a first core network function; or sending the shared tunnel establishment request to the access network node.

Optionally, the rejecting indicating establishment of the shared tunnel includes:

sending an instruction for rejecting establishing the shared tunnel to the access network node through a first core network function; or rejecting sending the shared tunnel establishment request to the access network node.

Optionally, the indicating establishment of a unicast tunnel includes:

sending an instruction for establishing a unicast tunnel to a first core network function.

Optionally, the rejecting indicating establishment of a unicast tunnel includes: sending an instruction for rejecting establishing a unicast tunnel to a first core network function; or rejecting sending an instruction for establishing a unicast tunnel to a first core network function.

Optionally, the instruction for establishing a unicast tunnel is further used to:

instruct the first core network function to send multicast service information associated with the unicast tunnel to the access network node.

It should be noted that all descriptions of the second core network node in the foregoing embodiments are applicable to the embodiment, and a technical effect same as the foregoing embodiment can also be achieved. Details are not described herein again.

Figure 6:
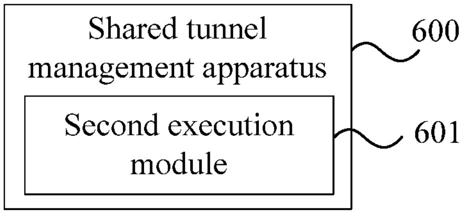
FIG. 6 is a second structural block diagram of a shared tunnel management apparatus according to an embodiment of this application.

As shown in FIG. 6, an embodiment of this application further provides a shared tunnel management apparatus 600, applied to a second core network node, and including:

a second execution module 601, configured to: obtain MBS capability information of an access network node, and initiate or reject initiating a shared tunnel establishment request based on the MBS capability information of the access network node; or send a shared tunnel establishment request of the access network node to a first core network node, and receive a shared tunnel establishment rejection message sent by the first core network node.

Optionally, the MBS capability information indicates that the access network node supports or does not support an MBS.

Optionally, the shared tunnel establishment rejection message is sent, based on the MBS capability information of the access network node, by the first core network node in a case that it is determined that the access network node does not support an MBS.

Optionally, an implementation in which the second execution module 601 initiates or rejects initiating a shared tunnel establishment request based on the MBS capability information of the access network node includes:

in a case that the access network node does not support an MBS, rejecting initiating, by the second core network node, the shared tunnel establishment request to the access network node; or in a case that the access network node supports an MBS, initiating, by the second core network node, the shared tunnel establishment request to the access network node.

Optionally, after the second execution module 601 receives a shared tunnel establishment rejection message sent by the first core network node, the apparatus further includes:

a determining module, configured to: determine that the access network node does not support an MBS, and reject initiating the shared tunnel establishment request to the access network node.

Optionally, an implementation of obtaining MBS capability information of an access network node includes at least one of:

receiving the MBS capability information that is of the access network node and is indicated by the first core network node; or determining the MBS capability information of the access network node based on established service information between the second core network node and the access network node.

It should be noted that, in this embodiment of this application, it can be ensured that an effective shared tunnel can be established in the core network, and the waste of communications resources can be avoided.

The shared tunnel management apparatus in this embodiment of this application may be an apparatus or an apparatus or electronic device with an operating system, or may be a component, an integrated circuit, or a chip in an electronic device. The apparatus or electronic device is mainly a non-mobile terminal. For example, the non-mobile terminal may be a server, a network attached storage (NAS), a personal computer (PC), a television (TV), a teller machine, a self-service machine, or the like. This is not limited in the embodiments of this application.

The shared tunnel management apparatus provided in this embodiment of this application can implement the processes implemented in the method embodiment in FIG. 4, and achieve a same technical effect. To avoid repetition, details are not provided herein again.

For example, an embodiment of this application further provides a core network node, where the core network node is a second core network node, and includes a processor, a memory, and a program or an instruction stored in the memory and executable on the processor. When the program or the instruction is executed by the processor, the processes of the embodiment of the shared tunnel management method applied to a second core network side are implemented, and a same technical effect can be achieved. To avoid repetition, details are not described herein again.

An embodiment of this application further provides a non-transitory computer-readable storage medium. The non-transitory computer-readable storage medium stores a program or an instruction. When the program or the instruction is executed by a processor, the processes of the embodiment of the shared tunnel management method applied to a second core network side are implemented, and a same technical effect can be achieved. To avoid repetition, details are not described herein again.

The non-transitory computer-readable storage medium is, for example, a read-only memory (ROM), a random access memory (RAM), a magnetic disk, or an optical disc.

An embodiment of this application further provides a core network node, the core network node is a second core network node and includes a processor and a communications interface, and the communications interface is configured to:

obtain MBS capability information of an access network node, and initiate or reject initiating a shared tunnel establishment request based on the MBS capability information of the access network node; or send a shared tunnel establishment request of the access network node to a first core network node, and receive a shared tunnel establishment rejection message sent by the first core network node.

The second core network node embodiment is corresponding to the second core network node side method embodiment, each implementation process and implementation of the method embodiment can be applied to the second core network node embodiment, and a same technical effect can be achieved.

For example, an embodiment of this application further provides a core network node. For a structure of the core network node, refer to FIG. 3, and the core network node is the second core network node.

For example, the core network node in this embodiment of this application includes programs or instructions stored in the memory and executable on the processor, and the processor invokes the programs or instructions in the memory to perform the method performed by the modules show in FIG. 6, and a same technical effect is achieved. To avoid repetition, details are not provided herein again.

An embodiment of this application further provides a multicast service tunnel management apparatus, applied to a second core network node, and including:

a third execution module, configured to: reject initiating a shared tunnel establishment request based on existence of a storage record for an information of an access network node; or initiate a shared tunnel establishment request based on non-existence of a storage record for an information of an access network node; or indicate or reject indicating establishment of a shared tunnel based on a state of a multicast session; or indicate establishment of a unicast tunnel based on existence of an access network node that does not support multicast in a multicast session; or reject indicating establishment of a unicast tunnel based on non-existence of an access network node that does not support multicast in a multicast session.

Optionally, the storage record is used to indicate that the access network node has joined the multicast session.

Optionally, when indicating or rejecting indicating establishment of a shared tunnel based on a state of a multicast session, the third execution module is configured to:

in a case that the multicast session is in an active state, indicate establishment of the shared tunnel; or in a case that the multicast session is in an inactive state, reject indicating establishment of the shared tunnel.

Optionally, when indicating establishment of the shared tunnel, the third execution module is configured to:

send an instruction for establishing the shared tunnel to the access network node through a first core network function; or send the shared tunnel establishment request to the access network node.

Optionally, when rejecting indicating establishment of the shared tunnel, the third execution module is configured to:

send an instruction for rejecting establishing the shared tunnel to the access network node through a first core network function; or reject sending the shared tunnel establishment request to the access network node.

Optionally, when indicating establishment of a unicast tunnel, the third execution module is configured to:

send an instruction for establishing a unicast tunnel to a first core network function.

Optionally, when rejecting indicating establishment of a unicast tunnel, the third execution module is configured to:

send an instruction for rejecting establishing a unicast tunnel to a first core network function; or reject sending an instruction for establishing a unicast tunnel to a first core network function.

Optionally, the instruction for establishing a unicast tunnel is further used to:

instruct the first core network function to send multicast service information associated with the unicast tunnel to the access network node.

The multicast service tunnel management apparatus in this embodiment of this application may be an apparatus or an apparatus or electronic device with an operating system, or may be a component, an integrated circuit, or a chip in an electronic device. The apparatus or electronic device is mainly a non-mobile terminal. For example, the non-mobile terminal may be a server, a network attached storage (NAS), a personal computer (PC), a television (TV), a teller machine, a self-service machine, or the like. This is not limited in the embodiments of this application.

The multicast service tunnel management apparatus provided in this embodiment of this application can implement the processes implemented in the method embodiment in FIG. 5, and achieve a same technical effect. To avoid repetition, details are not provided herein again.

For example, an embodiment of this application further provides a core network node, where the core network node is a second core network node, and includes a processor, a memory, and a program or an instruction stored in the memory and executable on the processor. When the program or the instruction is executed by the processor, the processes of the embodiment of the multicast service tunnel management method applied to a second core network side are implemented, and a same technical effect can be achieved. To avoid repetition, details are not described herein again.

An embodiment of this application further provides a non-transitory computer-readable storage medium. The non-transitory computer-readable storage medium stores a program or an instruction. When the program or the instruction is executed by a processor, the processes of the embodiment of the multicast service tunnel management method applied to a second core network side are implemented, and a same technical effect can be achieved. To avoid repetition, details are not described herein again.

The non-transitory computer-readable storage medium is, for example, a read-only memory (ROM), a random access memory (RAM), a magnetic disk, or an optical disc.

An embodiment of this application further provides a core network node, the core network node is a second core network node and includes a processor and a communications interface, and the processor is configured to:

reject initiating a shared tunnel establishment request based on existence of a storage record for an information of an access network node; or initiate a shared tunnel establishment request based on non-existence of a storage record for an information of an access network node; or indicate or reject indicating establishment of a shared tunnel based on a state of a multicast session; or indicate establishment of a unicast tunnel based on existence of an access network node that does not support multicast in a multicast session; or reject indicating establishment of a unicast tunnel based on non-existence of an access network node that does not support multicast in a multicast session.

The second core network node embodiment is corresponding to the second core network node side method embodiment, each implementation process and implementation of the method embodiment can be applied to the second core network node embodiment, and a same technical effect can be achieved.

For example, an embodiment of this application further provides a core network node. For a structure of the core network node, refer to FIG. 3, and the core network node is the second core network node.

For example, the core network node in this embodiment of this application includes programs or instructions stored in the memory and executable on the processor, and the processor invokes the programs or instructions in the memory to perform the foregoing method performed by the modules, and a same technical effect is achieved. To avoid repetition, details are not provided herein again.

Figure 7:
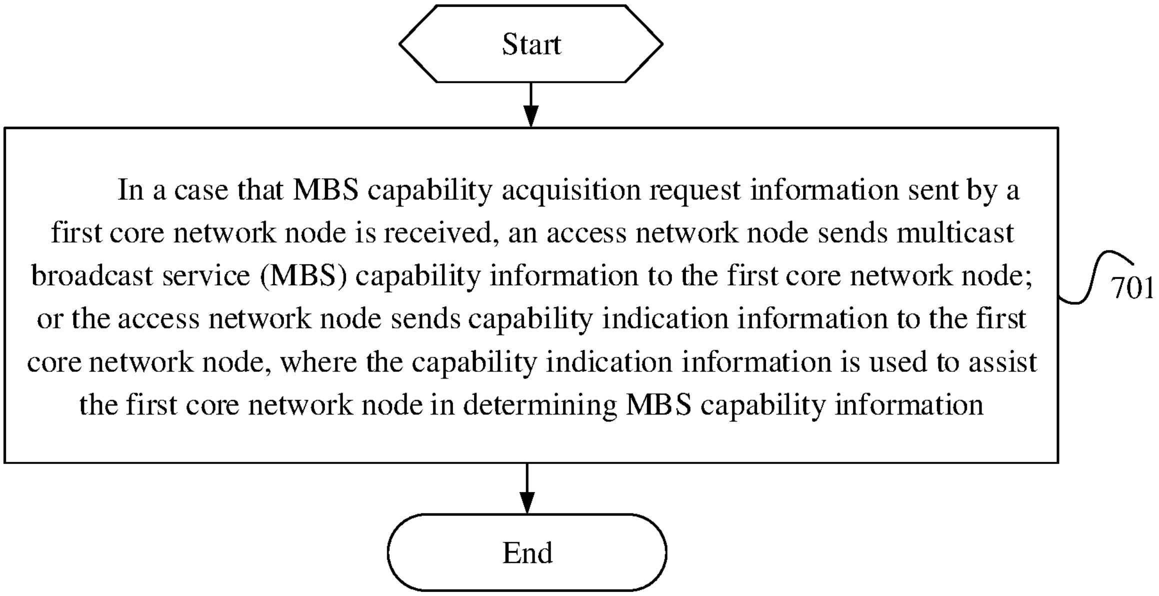
FIG. 7 is a third schematic flowchart of a shared tunnel management method according to an embodiment of this application.

As shown in FIG. 7, an embodiment of this application further provides a shared tunnel management method, including the following steps.

Step 701. In a case that MBS capability acquisition request information sent by a first core network node is received, an access network node sends multicast broadcast service (MBS) capability information to the first core network node; or the access network node sends capability indication information to the first core network node, where the capability indication information is used to assist the first core network node in determining MBS capability information.

Optionally, the MBS capability information indicates that the access network node supports or does not support an MBS.

It should be noted that all descriptions of the access network node in the foregoing embodiments are applicable to the embodiment, and a technical effect same as the foregoing embodiment can also be achieved. Details are not described herein again.

Figure 8:
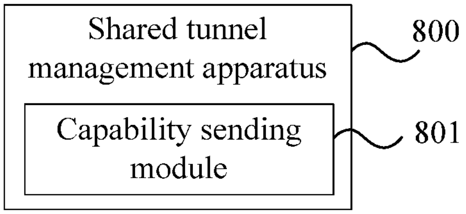
FIG. 8 is a third structural block diagram of a shared tunnel management apparatus according to an embodiment of this application.

As shown in FIG. 8, an embodiment of this application further provides a shared tunnel management apparatus 800, applied to an access network node, and including:

a capability sending module 801, configured to: in a case that MBS capability acquisition request information sent by a first core network node is received, send multicast broadcast service (MBS) capability information to the first core network node; or send capability indication information to the first core network node, where the capability indication information is used to assist the first core network node in determining MBS capability information.

Optionally, the MBS capability information indicates that the access network node supports or does not support an MBS.

It should be noted that, in this embodiment of this application, it can be ensured that an effective shared tunnel can be established in the core network, and the waste of communications resources can be avoided.

The shared tunnel management apparatus in this embodiment of this application may be an apparatus or an apparatus or electronic device with an operating system, or may be a component, an integrated circuit, or a chip in an electronic device. The apparatus or electronic device is mainly a non-mobile terminal. For example, the non-mobile terminal may be a server, a network attached storage (NAS), a personal computer (PC), a television (TV), a teller machine, a self-service machine, or the like. This is not limited in the embodiments of this application.

The shared tunnel management apparatus provided in this embodiment of this application can implement the processes implemented in the method embodiment in FIG. 6, and achieve a same technical effect. To avoid repetition, details are not provided herein again.

An embodiment of this application further provides an access network node, including a processor and a communications interface, and the communications interface is configured to:

in a case that MBS capability acquisition request information sent by a first core network node is received, send multicast broadcast service (MBS) capability information to the first core network node; or send capability indication information to the first core network node, where the capability indication information is used to assist the first core network node in determining MBS capability information.

Figure 9:
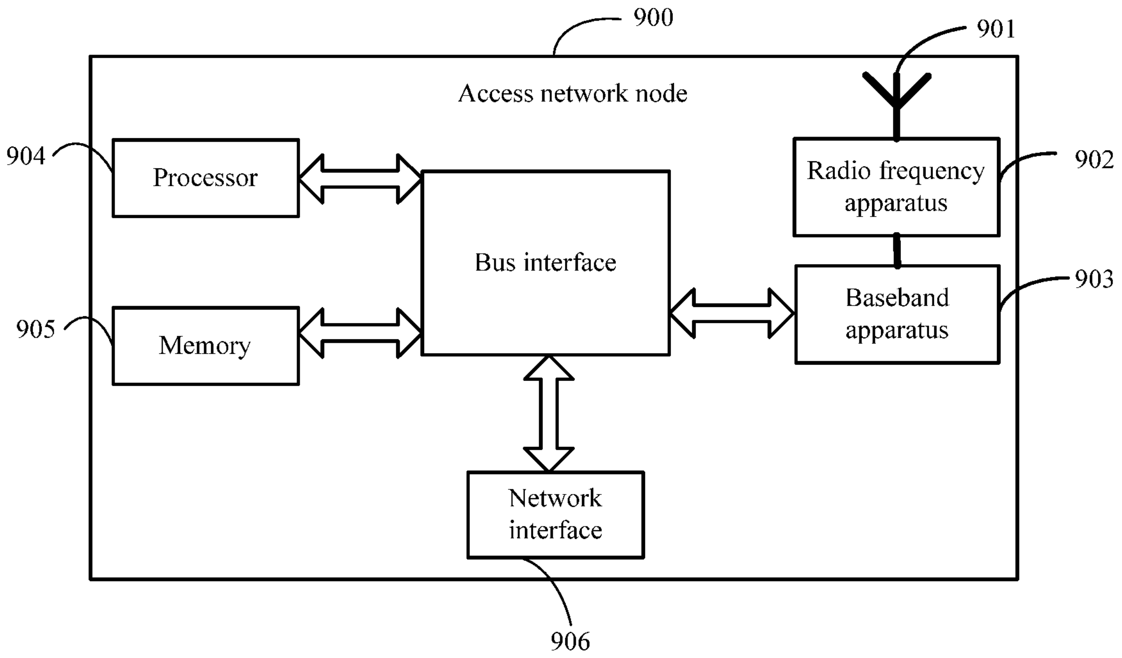
FIG. 9 is a structural block diagram of an access network node according to an embodiment of this application.

The access network node embodiment is corresponding to the access core network node side method embodiment, each implementation process and implementation of the method embodiment can be applied to the access network node embodiment, and a same technical effect can be achieved. For example, FIG. 9 is a schematic diagram of a hardware structure of an access network node according to an embodiment of this application.

The access network node 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes information that needs to be sent, and sends processed information to the radio frequency apparatus 902. The radio frequency apparatus 902 processes the received information, and sends processed information by using the antenna 901.

The frequency band processing apparatus may be located in the baseband apparatus 903. The method performed by the network side device in the foregoing embodiment may be implemented in the baseband apparatus 903. The baseband apparatus 903 includes a processor 904 and a memory 905.

The baseband apparatus 903 may include, for example, at least one baseband board, where multiple chips are disposed on the baseband board. As shown in FIG. 9, one chip is, for example, the processor 904, which is connected to the memory 905, to invoke a program in the memory 905, and perform core network node operations shown in the foregoing method embodiment.

The baseband apparatus 903 may further include a network interface 906, configured to exchange information with the radio frequency apparatus 902. For example, the interface is a common public radio interface (CPRI).

For example, the access network node in this embodiment of this application further includes programs or instructions stored in the memory 905 and executable on the processor 904, and the processor 904 invokes the programs or instructions in the memory 905 to perform the method performed by the modules show in FIG. 8, and a same technical effect is achieved. To avoid repetition, details are not provided herein again.

For example, an embodiment of this application further provides an access network node, including a processor, a memory, and a program or an instruction stored in the memory and executable on the processor. When the program or the instruction is executed by the processor, the processes of the embodiment of the shared tunnel management method applied to an access network node side are implemented, and a same technical effect can be achieved. To avoid repetition, details are not described herein again.

An embodiment of this application further provides a non-transitory computer-readable storage medium. The non-transitory computer-readable storage medium stores a program or an instruction. When the program or the instruction is executed by a processor, the processes of the embodiment of the shared tunnel management method applied to an access network node side are implemented, and a same technical effect can be achieved. To avoid repetition, details are not described herein again. The non-transitory computer-readable storage medium is, for example, a read-only memory (ROM), a random access memory (RAM), a magnetic disk, or an optical disc.

Figure 10:
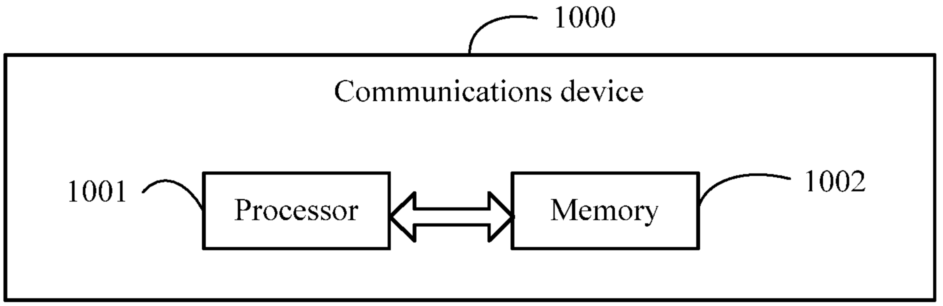
FIG. 10 is a structural block diagram of a communications device according to an embodiment of this application.

Optionally, as shown in FIG. 10, an embodiment of this application further provides a communications device 1000, including a processor 1001, a memory 1002, a program or an instruction stored in the memory 1002 and executable on the processor 1001. For example, when the communications device 1000 is a core network node, the program or the instruction is executed by the processor 1001 to implement the processes of the embodiment of the shared tunnel management method applied to the first core network node or second core network node side, and a same technical effect can be achieved. When the communications device 1000 is an access network node, the program or the instruction is executed by the processor 1001 to implement the processes of the embodiment of the shared tunnel management method applied to an access network node side, and a same technical effect can be achieved. To avoid repetition, details are not described herein again.

The terminal in this embodiment of this application may be a device providing voice and/or data connectivity to a user, a handheld device with a wireless connection function, or another processing device connected to a wireless modem. In different systems, names of terminal devices may be different. For example, in a 5G system, a terminal device may be referred to as user equipment. The wireless terminal device may communicate with one or more core networks (CN) by using a radio access network. The wireless terminal device may be a mobile terminal device, such as a mobile phone (or referred to as a "cellular" phone) and a computer with a mobile terminal device. For example, the wireless terminal device may be a portable, pocket-sized, handheld, computer built-in, or in-vehicle mobile apparatus that exchanges voice and/or data with a radio access network. For example, a personal communication service (PCS) telephone, a cordless telephone, a session initiated protocol (SIP) telephone, a wireless local loop (WLL) station, a personal digital assistant (PDA), and another device. The wireless terminal device can also be referred to as a system, a subscriber unit, a subscriber station, a mobile station, a mobile console, a remote station, an access point, a remote terminal, an access terminal, a user terminal, a user agent, and a user device, which is not limited in this embodiment of this application.

The access network node in this embodiment of this application may be a base transceiver station (BTS) in a Global System of Mobile Communication (GSM) or Code Division Multiple Access (CDMA), or may be a NodeB (NB) in Wideband Code Division Multiple Access (WCDMA), or may be an evolved NodeB (eNB or eNodeB) in LTE, or a relay station or an access point, or a base station in a future 5th generation (5G) mobile communication network, which is not limited herein.

One or more antennas can be used for Multi Input Multi Output (MIMO) transmission between the network side device and the terminal, and the MIMO transmission can be single user MIMO (SU-MIMO) or multiple user MIMO (MU-MIMO). Based on the shape and quantity of antenna combinations, MIMO transmission may be 2 dimension Multi Input Multi Output (2D-MIMO), 3 dimension Multi Input Multi Output (3D-MIMO), full dimension Multi Input Multi Output (FD-MIMO), or massive-Multi Input Multi Output (massive-MIMO), and may also be diversity transmission, precoding transmission, or beamforming transmission.

An embodiment of this application further provides a chip. The chip includes a processor and a communications interface, the communications interface is coupled to the processor, and the processor is configured to execute a program or an instruction to implement the processes of the foregoing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application provides a computer program/program product, the computer program/program product is stored in a non-volatile storage medium, the computer program/program product is executed by at least one processor to implement the processes of the method embodiment, and a same technical effect can be achieved. To avoid repetition, details are not described herein again.

It should be noted that in this specification, the term "include", "comprise", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a software product. The computer software product is stored in a storage medium (such as an ROM/RAM, a hard disk, or an optical disc), and includes several instructions for instructing a network device to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A shared tunnel management method, comprising:

obtaining, by a first core network node, multicast broadcast service (MBS) capability information of at least one access network node; wherein the MBS capability information is used for management of shared tunnel establishment;

after the obtaining, by the first core network node, the MBS capability information of the at least one access network node, the method further comprises:

performing a first operation based on the MBS capability information of the at least one access network node; wherein the first operation comprises: responding to a shared tunnel establishment request sent by a second core network node;

wherein the responding to the shared tunnel establishment request sent by the second core network node comprises at least one of:

receiving the shared tunnel establishment request sent by the second core network node, and accepting or rejecting the shared tunnel establishment request based on the MBS capability information of the access network node; or receiving the shared tunnel establishment request sent by the second core network node, and sending a group notification message or single terminal paging to the access network node based on the MBS capability information of the access network node and a state of the terminal, wherein the terminal is determined based on the shared tunnel establishment request.

2. The method according to claim 1, wherein the MBS capability information indicates that the access network node supports or does not support an MBS.

3. The method according to claim 1, wherein the accepting or rejecting the shared tunnel establishment request based on the MBS capability information of the access network node comprises at least one of:

rejecting the shared tunnel establishment request in a case that the MBS capability information indicates that the access network node does not support an MBS; or accepting the shared tunnel establishment request in a case that the MBS capability information indicates that the access network node supports the MBS; wherein in a case of accepting the shared tunnel establishment request, the method further comprises:

sending a shared tunnel establishment request message to the access network node; or in a case of rejecting the shared tunnel establishment request, the method further comprises:

sending a shared tunnel establishment rejection message to the second core network node.

4. The method according to claim 1, wherein the sending the group notification message or the single terminal paging to the access network node based on the MBS capability information of the access network node and the state of the terminal comprises:

in a case that the MBS capability information indicates that the access network node does not support an MBS, and the terminal is in an idle state, sending the single terminal paging to the access network node; and in a case that the MBS capability information indicates that the access network node supports the MBS, and the terminal is in the idle state, sending the group notification message to the access network node.

5. The method according to claim 1, wherein the obtaining, by the first core network node, the MBS capability information of the at least one access network node comprises:

sending MBS capability acquisition request information to the at least one access network node, and receiving MBS capability information fed back by the at least one access network node based on the MBS capability acquisition request information; or receiving capability indication information sent by the at least one access network node, and determining MBS capability information of the at least one access network node based on the capability indication information.

* * * * *